United States Patent
Ealey et al.

(10) Patent No.: US 7,401,932 B2
(45) Date of Patent: Jul. 22, 2008

(54) HIGH AUTHORITY DEFORMABLE OPTICAL SYSTEM

(75) Inventors: Mark A. Ealey, Littleton, MA (US); John A. Wellman, Chelmsford, MA (US)

(73) Assignee: Xinetics, Inc., Devens, MA (US)

( * ) Notice: Subject to any disclaimer, the term of this patent is extended or adjusted under 35 U.S.C. 154(b) by 0 days.

(21) Appl. No.: 11/123,473

(22) Filed: May 6, 2005

(65) Prior Publication Data

US 2006/0262434 A1    Nov. 23, 2006

(51) Int. Cl.
*G02B 5/08* (2006.01)
*G02B 7/182* (2006.01)

(52) U.S. Cl. ..................... 359/849

(58) Field of Classification Search ........... 359/846, 359/849
See application file for complete search history.

(56) References Cited

U.S. PATENT DOCUMENTS

| | | | |
|---|---|---|---|
| 4,655,563 A * | 4/1987 | Plante et al. | 359/849 |
| 6,398,373 B1 * | 6/2002 | Guzman et al. | 359/846 |
| 6,902,281 B2 * | 6/2005 | Bennett et al. | 359/846 |
| 2003/0116704 A1 * | 6/2003 | Mueller-Wirts | 250/235 |
| 2005/0046976 A1 * | 3/2005 | Ealey | 359/846 |
| 2005/0162762 A1 * | 7/2005 | Novak | 359/849 |
| 2006/0142877 A1 * | 6/2006 | Solomon | 700/11 |

* cited by examiner

*Primary Examiner*—Alessandro Amari
(74) *Attorney, Agent, or Firm*—Iandiorio Teska & Coleman

(57) ABSTRACT

A high authority deformable optical system includes an optical faceplate; a base; a plurality of circuit boards, each including at least one actuator; each actuator engaging at one end the base and at the other the optical faceplate; each printed circuit board providing conductor paths between its associated actuators and a connector device for selectively energizing the actuators.

10 Claims, 12 Drawing Sheets

HIGH AUTHORITY DEFORMABLE OPTICAL SYSTEM

FIELD OF THE INVENTION

This invention relates to a high authority deformable optical system.

BACKGROUND OF THE INVENTION

Conventional deformable mirrors employ a multiplicity of surface normal actuators each of which has to be individually bonded to a base and have its contact leads brought out to a connection area. This approach is highly labor intensive as it requires proper positioning, orientation alignment and mounting of each actuator. Further, the actuators are testable only individually before installation or after all have been installed. The result is an expensive and time-consuming effort with significant chances of misaligned and inoperable actuators.

BRIEF SUMMARY OF THE INVENTION

It is therefore an object of this invention to provide an improved high authority deformable optical system.

It is a further object of this invention to provide such an improved high authority deformable optical system which is easy and fast to assemble.

It is a further object of this invention to provide such an improved high authority deformable optical system which facilitates positioning, orientation, and alignment for mounting the actuators.

It is a further object of this invention to provide such an improved high authority deformable optical system in which the actuators can be tested in groups after or before final assembly.

It is a further object of this invention to provide such an improved high authority deformable optical system in which the actuators are bonded to the faceplate and base in groups prealigned and properly oriented and positioned.

It is a further object of this invention to provide such an improved high authority deformable optical system which is lightweight and compact.

It is a further object of this invention to provide such an improved high authority deformable optical system which connects the actuator leads to a connection area through an orderly efficient array of conductors.

It is a further object of this invention to provide such an improved high authority deformable optical system which employs printed circuit boards to both electrically connect and pre-align and mount the actuators The invention results from the realization that a high authority deformable optical system which can be simply and quickly fabricated while insuring proper positioning, orientation and alignment of the actuators can be achieved with an optical faceplate, a base and a plurality of printed circuit boards, each of which carries one or more actuators which it mounts in prealigned relationship and provides conductor paths between the actuators and a connection device for selectively energizing the actuators.

The subject invention, however, in other embodiments, need not achieve all these objectives and the claims hereof should not be limited to structures or methods capable of achieving these objectives.

This invention features a high authority deformable optical system including an optical faceplate, a base, and a plurality of printed circuit boards each including at least one actuator. Each actuator engages at one end, the base and at the other end the optical faceplate. Each printed circuit board provides conductor paths between its associated actuators and a connector device for selectively energizing the actuator.

In a preferred embodiment the faceplate may include a mirror on its front face; it may include pusher pads on its back face. The pusher pads may be integral with the faceplate. The base may include a reaction mass, it may be solid or hollow. The printed circuit boards may be disposed in an aligned relationship. There may be a frame having a plurality of prealigned mounting slots and the printed circuit boards may be mounted in those slots. The actuators may be bonded to the base and faceplate; the bonding may be by an adhesive.

The invention also features a high authority deformable mirror system including an optical faceplate, a frame including a plurality of prealigned mounting slots, and a base. There is a plurality of printed circuit boards mounted in the prealigned mounting slots each printed circuit board including at least one actuator. Each actuator is engaged at one end with the base and at the other with the optical faceplate. Each printed circuit board provides conductor paths between its associated actuators and a connector device for selectively energizing the actuators.

BRIEF DESCRIPTION OF THE DRAWINGS

Other objects, features and advantages will occur to those skilled in the art from the following description of a preferred embodiment and the accompanying drawings, in which:

FIG. 7B is a three dimensional schematic view of a jig used during fabrication to position the printed circuit boards in the structure of FIG. 7A where there is not a permanent slotted frame;

DISCLOSURE OF THE PREFERRED EMBODIMENT

Figure 1:
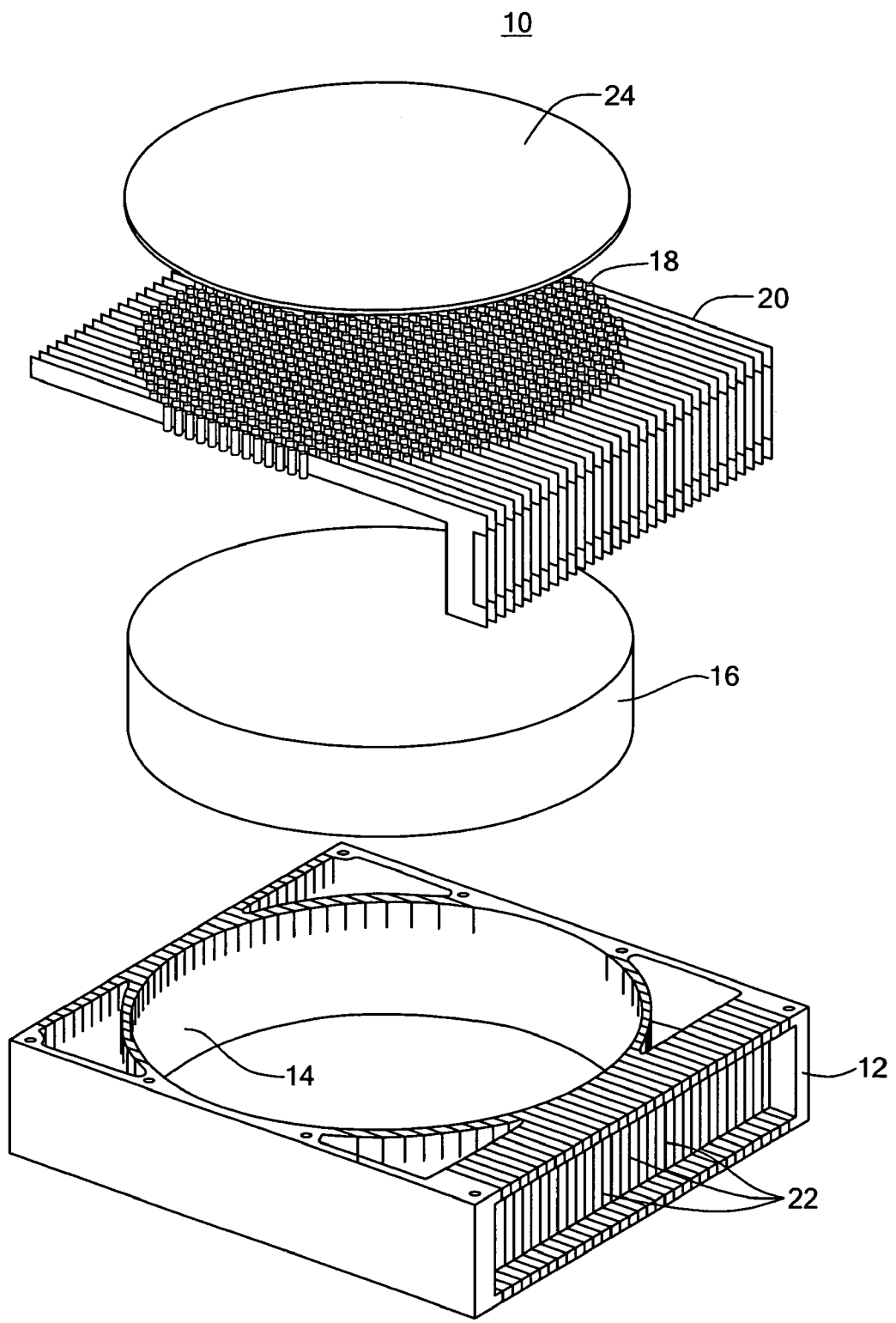
FIG. 1 is an exploded diagrammatic view of a high authority deformable optical system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a high authority deformable optical system 10 according to this invention which includes a frame or bezel 12 having a hole or well 14 for receiving base 16 which may be solid or hollow and may form a reaction mass for the actuators 18 on printed circuit boards 20. Printed circuit boards with one or more actuators 18 attached to each fit into prealigned slots 22 on frame 12 to automatically align and position the printed circuit boards and thus the actuators 18 that they carry quickly and easily. Mounted on top of actuators 18 is faceplate 24 which is an optical element, typically a mirror. Actuators 18 have their upper ends bonded or engaged with pusher pads on the base of faceplate 24 while the top of faceplate 24 may be finished as a mirror. The other ends of actuators 18 are attached to base 16 which may function as a reaction mass. Each circuit board 20 may carry a different number of actuators, depending upon its position in the area on the faceplate 24. For example, those printed circuit boards toward the center of faceplate 24 which approach to diameter of faceplate 24 will have the most number of actuators while the ones to either side, to the left and right, as shown on FIG. 1 will have just a few actuators.

Figure 2:
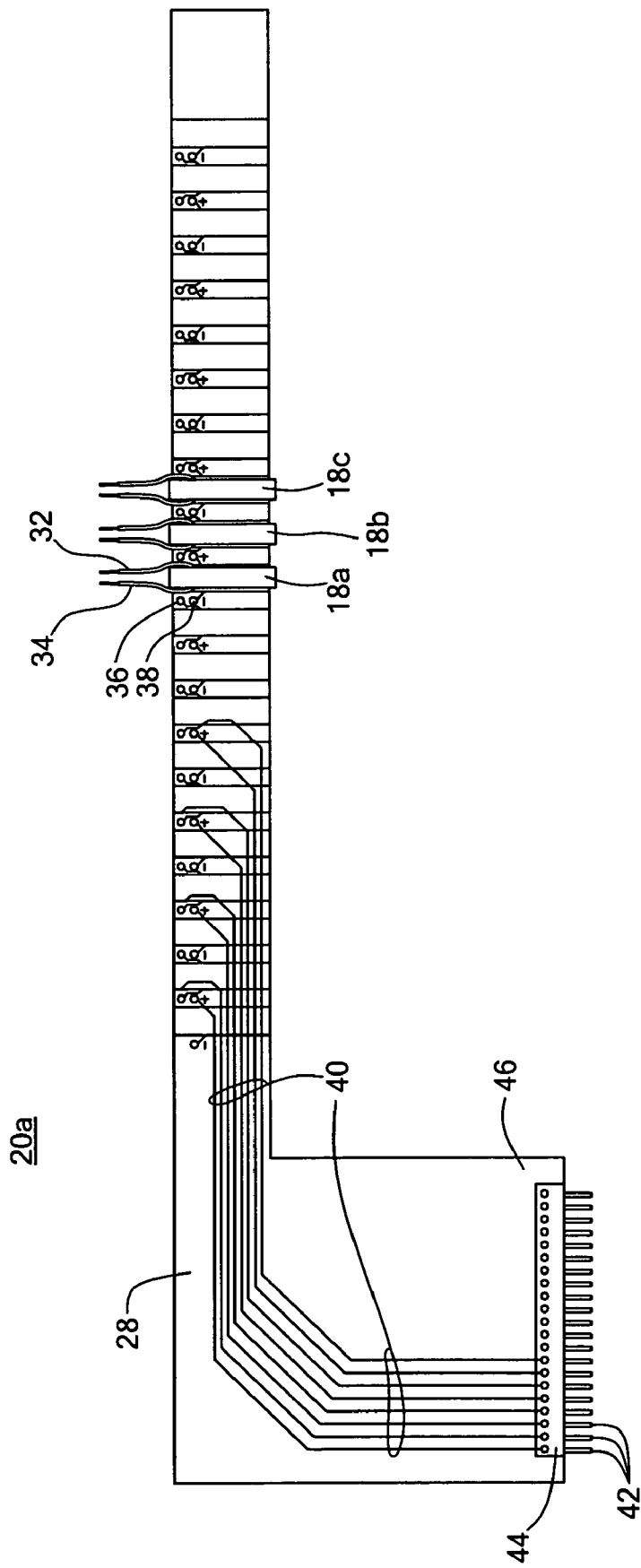
FIGS. 2 and 3 are side elevational views of a printed circuit board used in FIG. 1.
Figure 3:
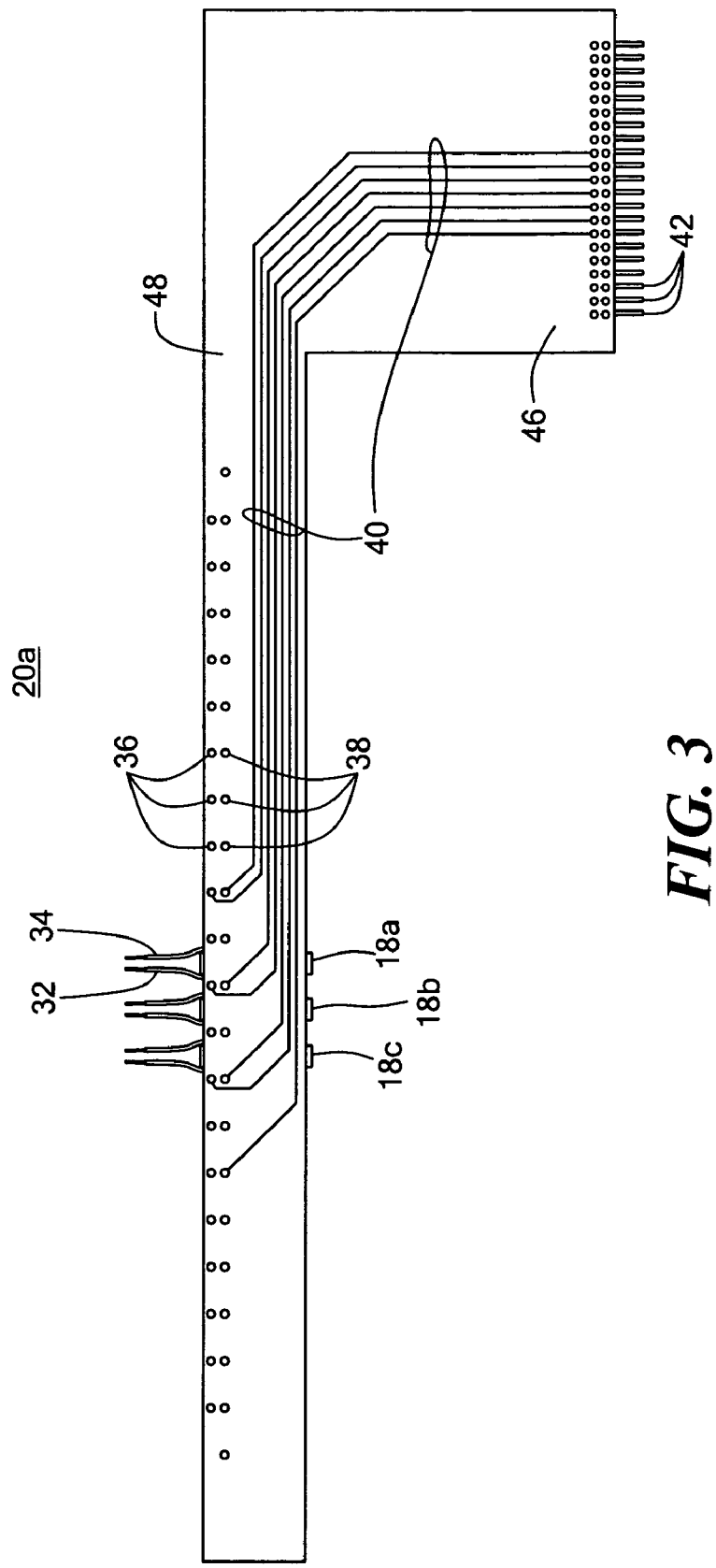

A typical printed circuit board 20a has its two sides shown in FIGS. 2 and 3, respectively. FIG. 2 illustrates the side 28 of circuit board 20a that carries the actuators, in this case just three 18a, 18b, 18c, and connector 44. The leads from each actuator, for example, leads 32 and 34 of actuator 18a are connected to an associated pair of terminals or contacts 36 and 38, respectively, which connect with conductors shown as a group at 40 which then connect to pairs of pins 42 in connector 44 which is fastened to the end 46 of printed circuit board 20. The other side 48, FIG. 3, of printed circuit board 20a does not contain the actuators or the connectors but has additional conductors 40a, for example, and displays more clearly, perhaps, terminals 36 and 38. Actuators 18 are fasten to printed circuit board 20 by some bonding means, for example, double sided tape, or an adhesive such as Epotek 301-2.

Figure 4:
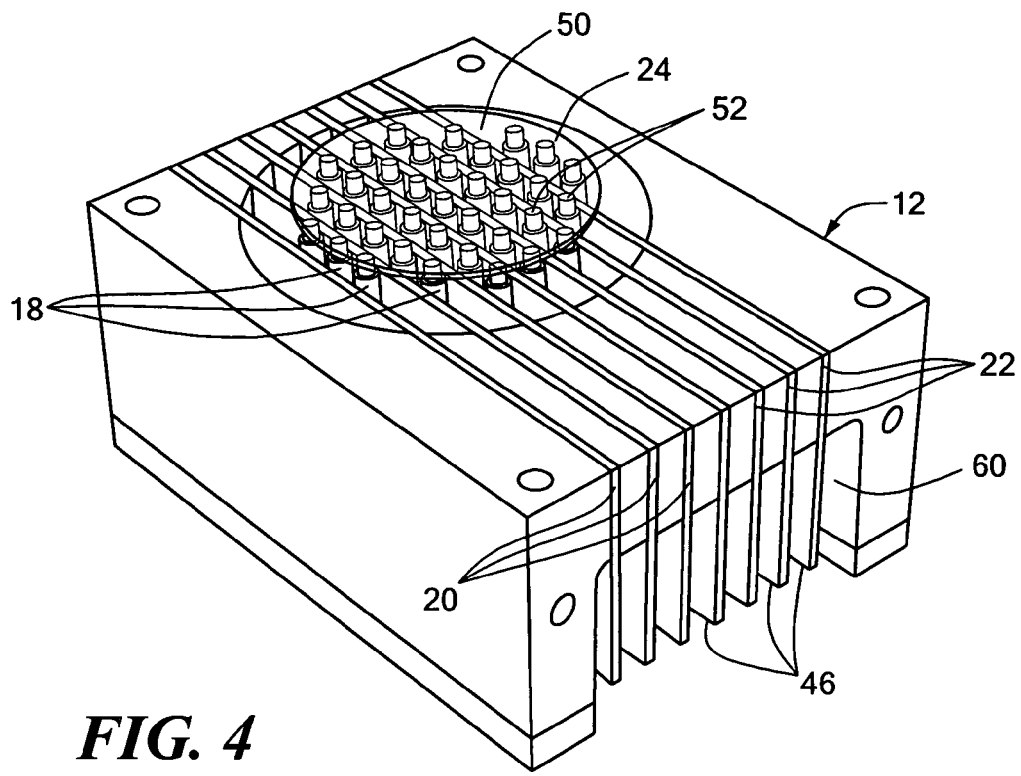
FIG. 4 is a three dimensional view of a frame (bezel) with base, and printed circuit boards with actuators installed.
Figure 5:
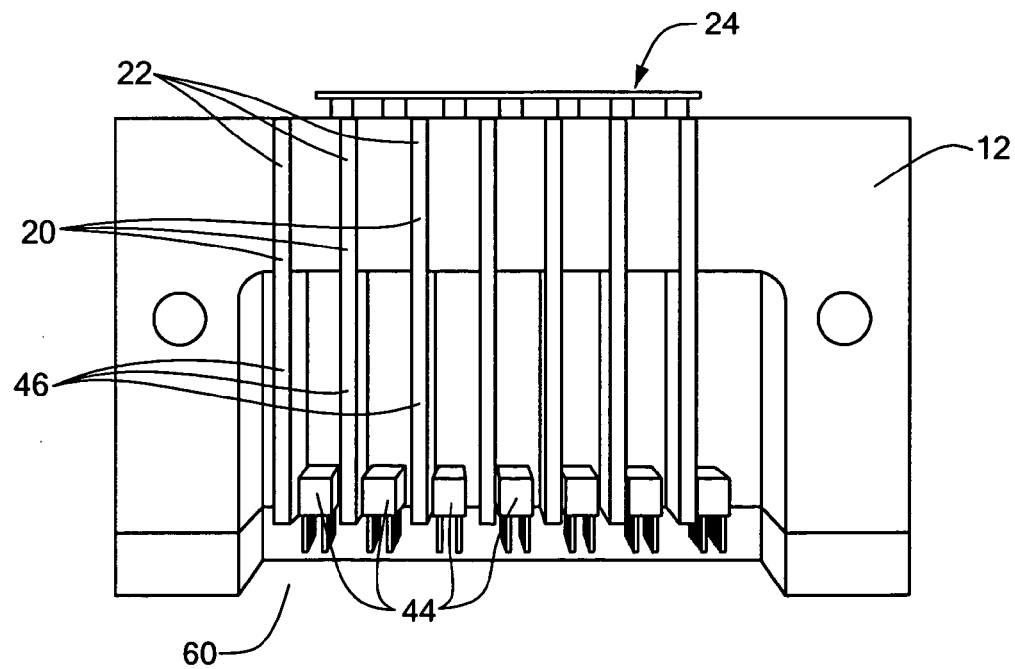
FIG. 5 is an end view of a frame or bezel showing the printed circuit boards in the slots with their electrical connectors at their lower ends.
Figure 6:
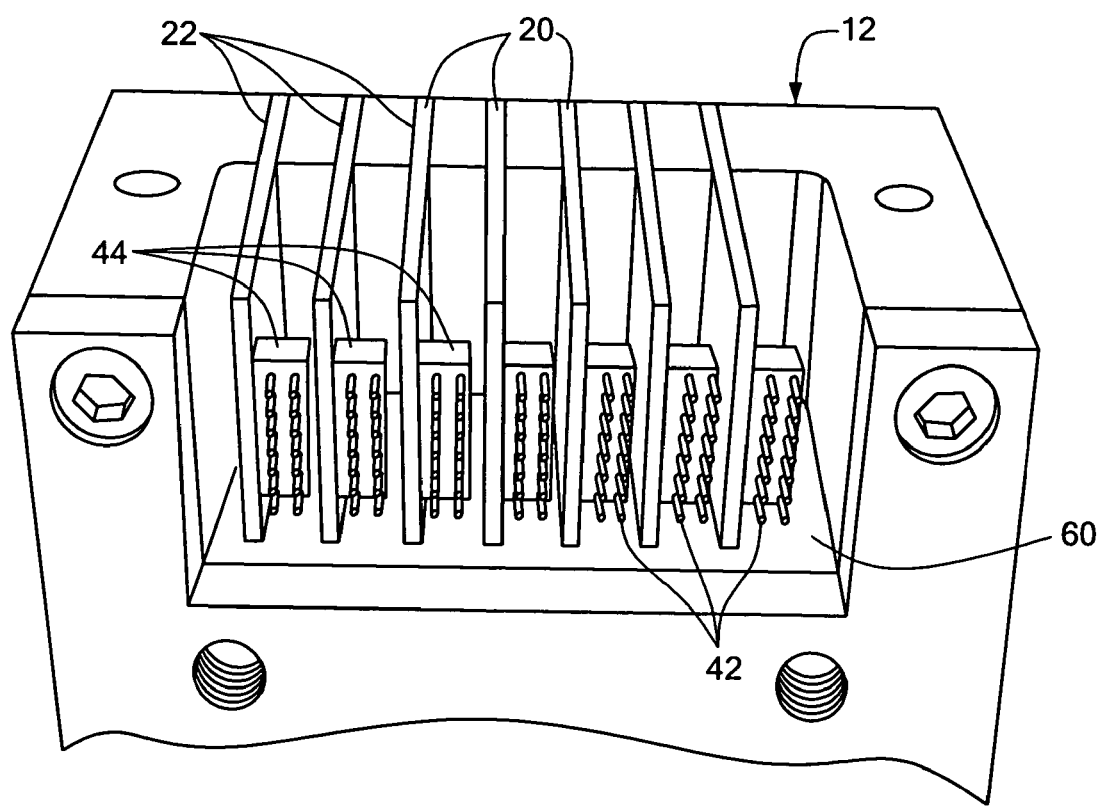
FIG. 6 is a bottom view of the end of the frame in FIG. 5 showing to more advantage the electrical connections on the ends of the circuit boards.

Face plate 24, FIG. 4 may include a mirror surface 50 on its upper side and the plurality of pusher pads 52 on its other side which engage with actuators 18. The actuators may be engaged in any suitable fashion with the pusher pads on faceplate 24 and the topside of base 16. For example, they may be bonded using Epotek 301-2. Frame 12 includes a recess 60 which receives the ends 46 of printed circuit boards 20 that are held in slots 22 which extend all away across the frame for purposes of good alignment and stability. At the lower ends the connectors 44 are available in recess 60, FIG. 5, where each connector is fastened to the lower portion of end 46. The form of connectors 44 and their pins 42 are shown with even greater clarity in FIG. 6. Base 16 need not be solid: it may be hollow to further reduce the weight of the system.

Figure 7:
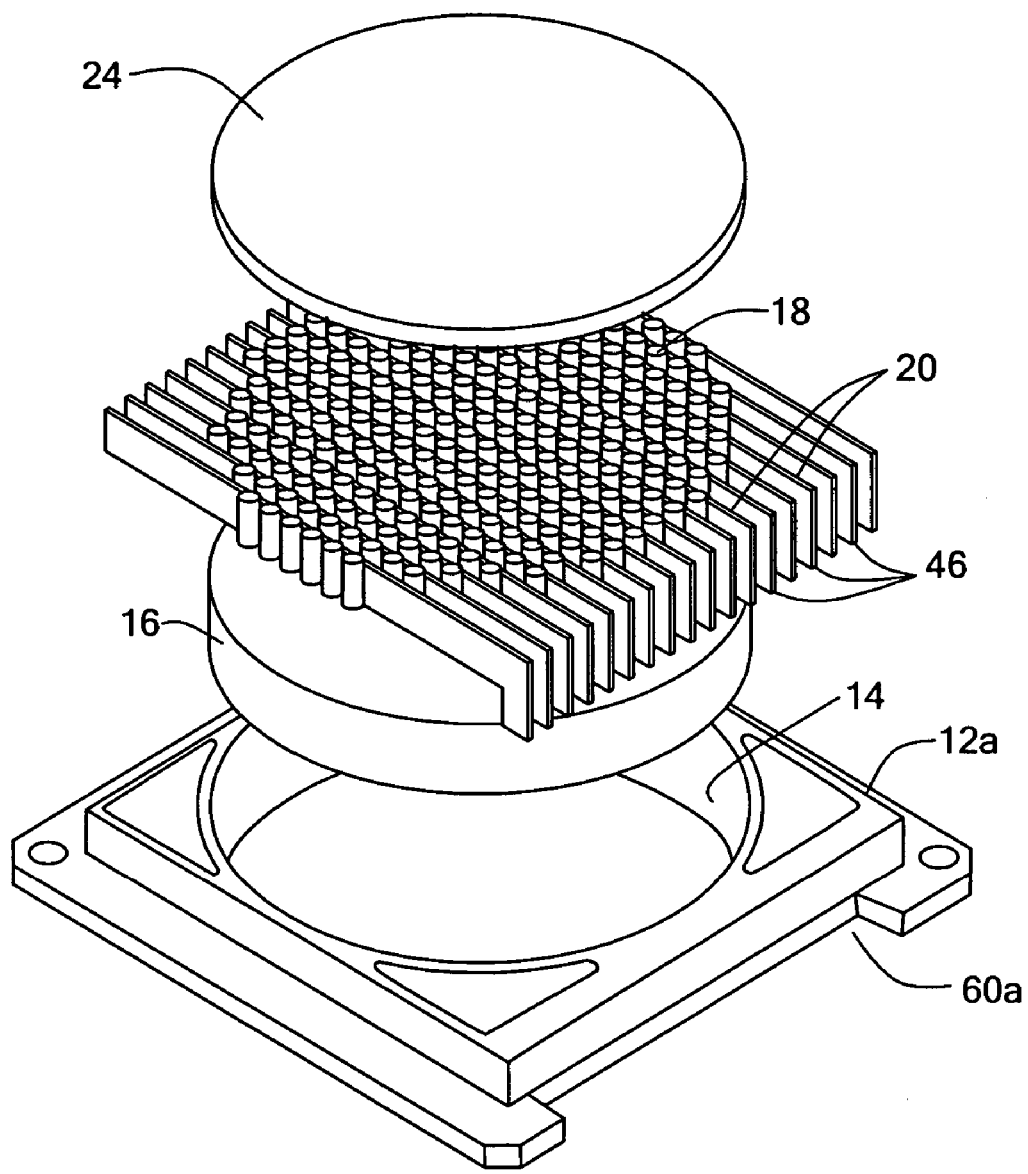
FIG. 7 is a view similar to FIG. 1 with printed circuit boards without the frame.

Although, thus far the printed circuit boards with the actuators attached are fitted into prealigned slots 22 in frame 12, this is not a necessary limitation of the invention. For example, the printed circuit boards 20 may be secured in position, FIG. 7, while actuators 18 are bonded to the pusher pads on the bottom of faceplate 24 and to the top of base 16. Then the entire assembly can be placed in the well 14 of frame or bezel 12a which has a recess 60a for receiving the ends 46 of the printed circuit boards 20 with their connectors 44. The elimination of slotted 22 frame 12 results in an even lighter structure. In that case a jig (not shown), is used temporarily to position the actuators 18 until their bottoms are bonded to the base and their tops to the faceplate. The Jig is a comb-like structure with opposing sets of fingers forming slots for positioning printed circuit boards 20 and spaced to accommodate the actuators 18 bonded thereto e.g., double sided tape or adhesive. End flanges receive screws (not shown) for temporarily securing it to the base.

Figure 8A:
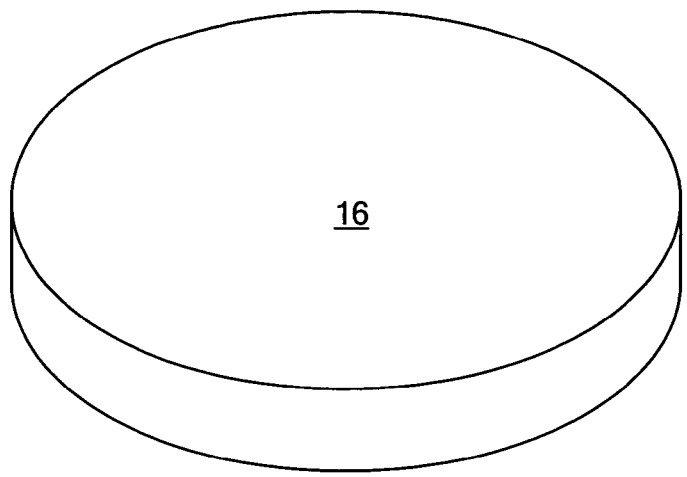
FIG. 8A-K illustrate the simple fabrication of the system of this invention.
Figure 8B:
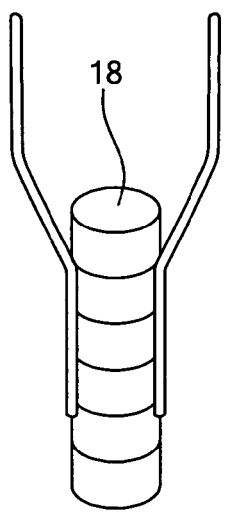
Figure 8C:
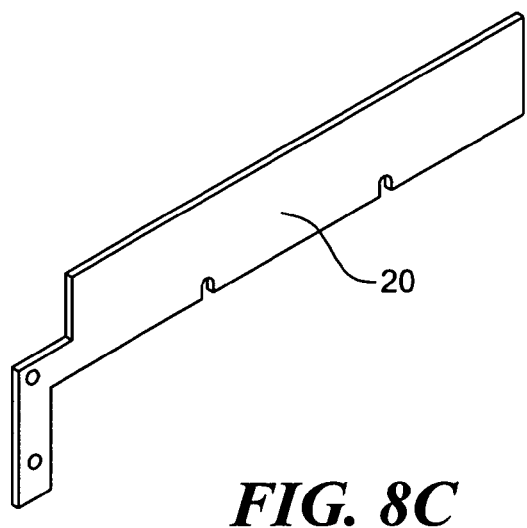
Figure 8D:
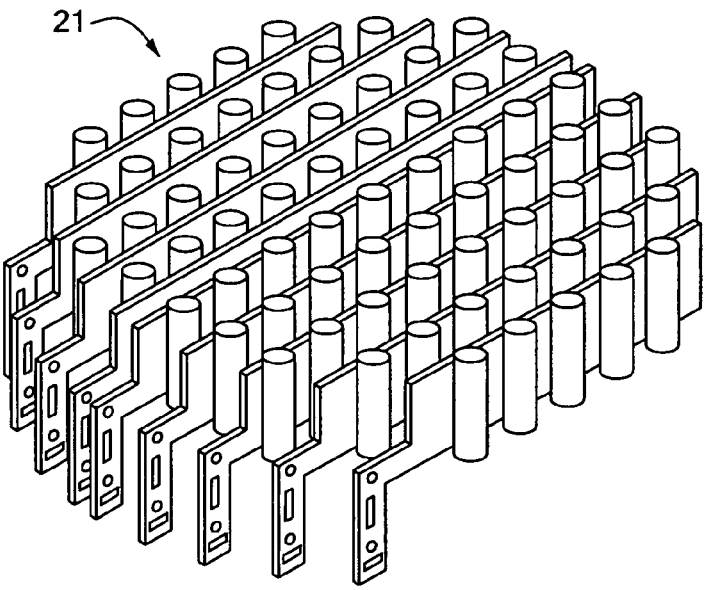
Figure 8E:
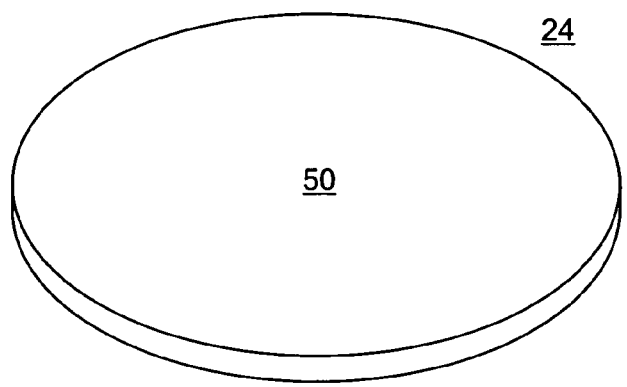
Figure 8F:
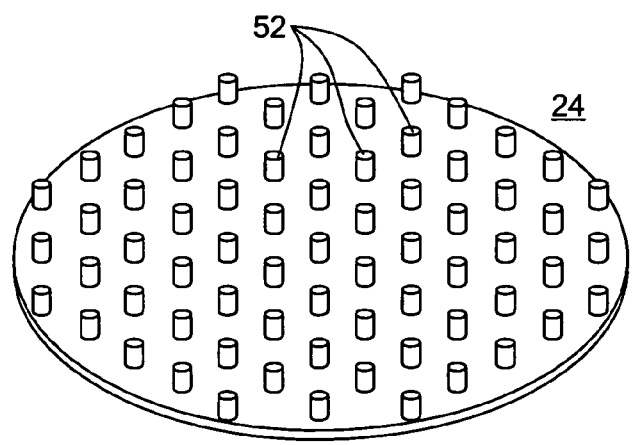
Figure 8G:
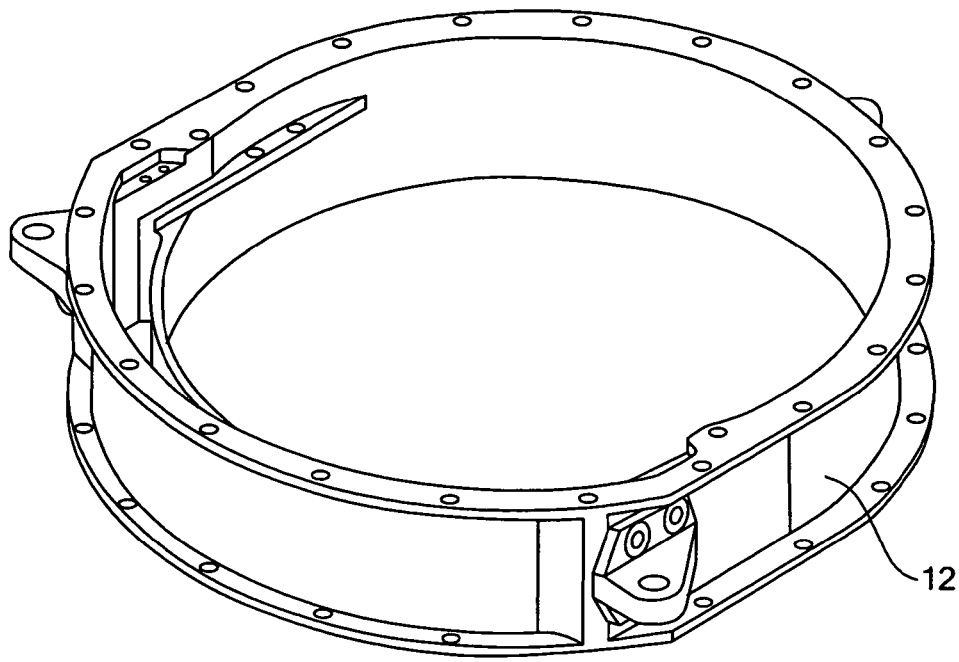
Figure 8H:
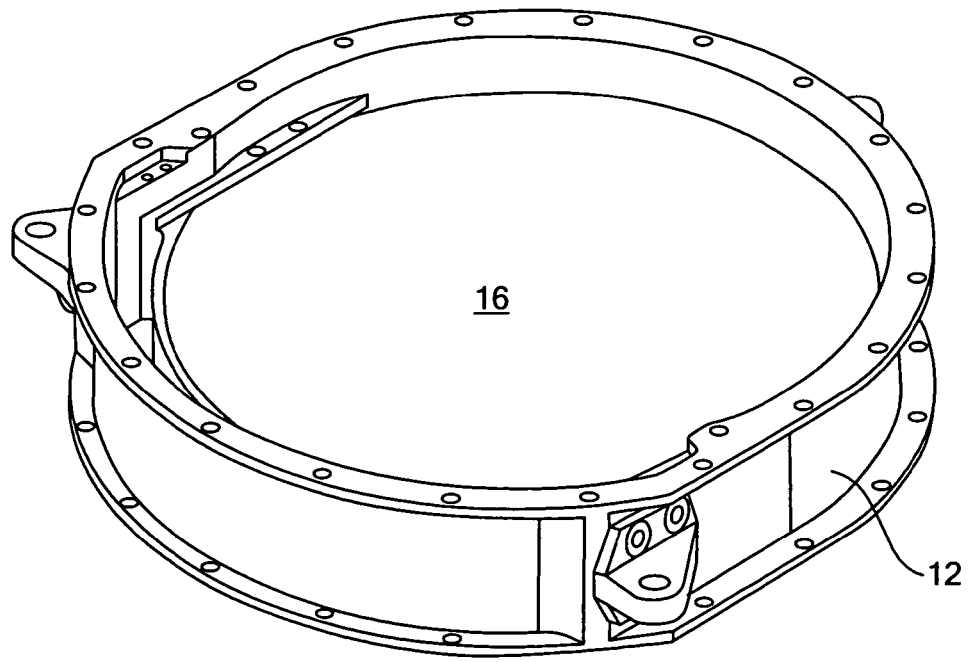
Figure 8I:
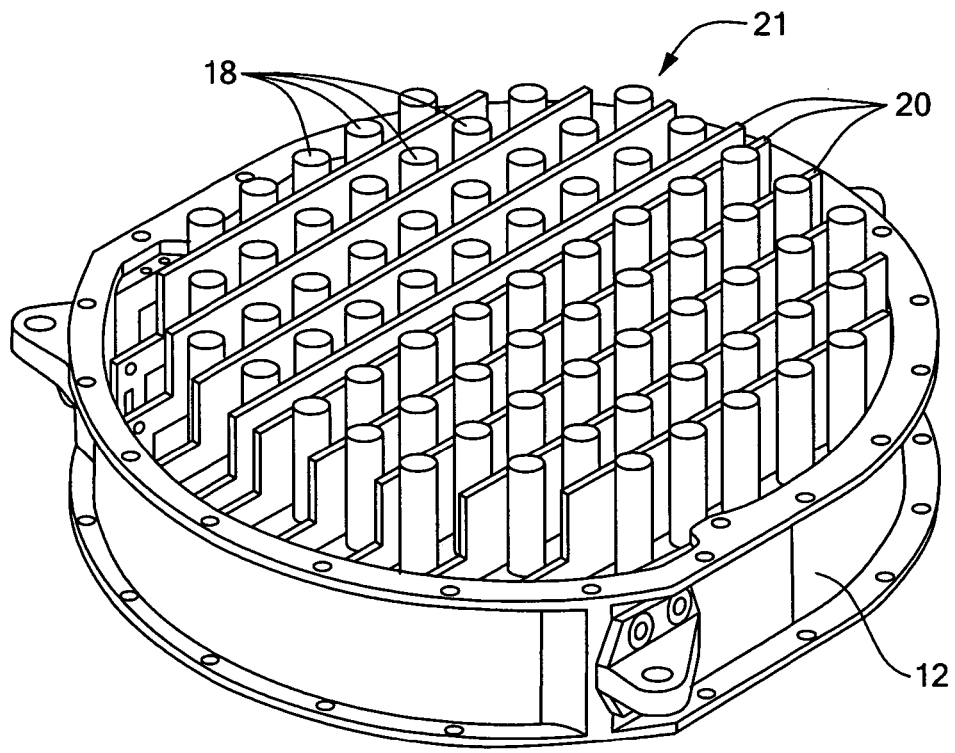
Figure 8J:
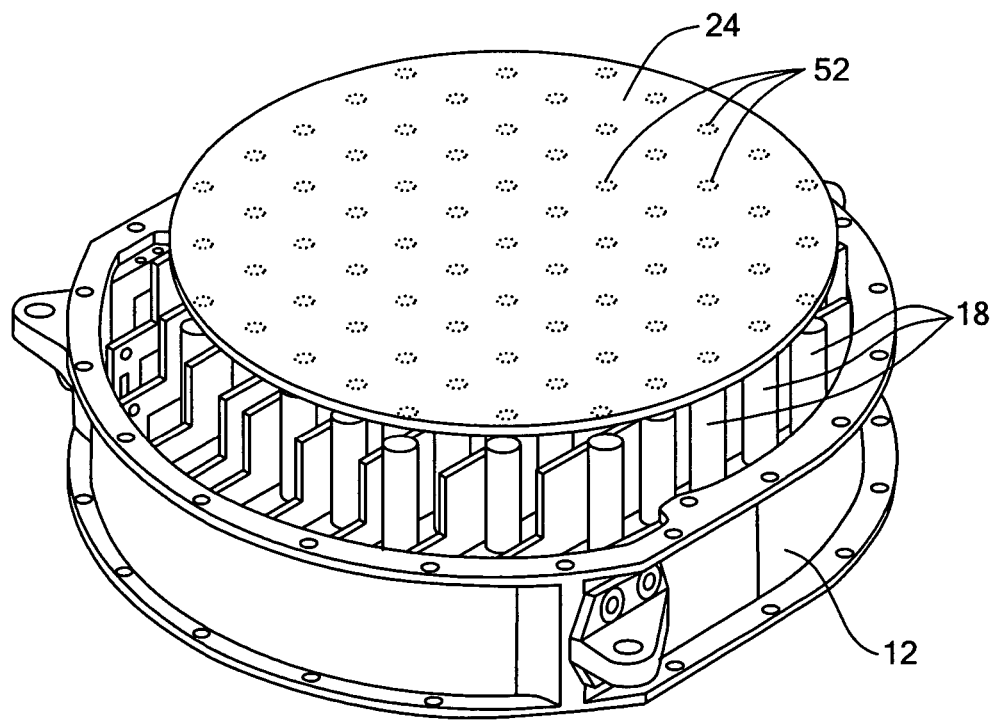
Figure 8K:
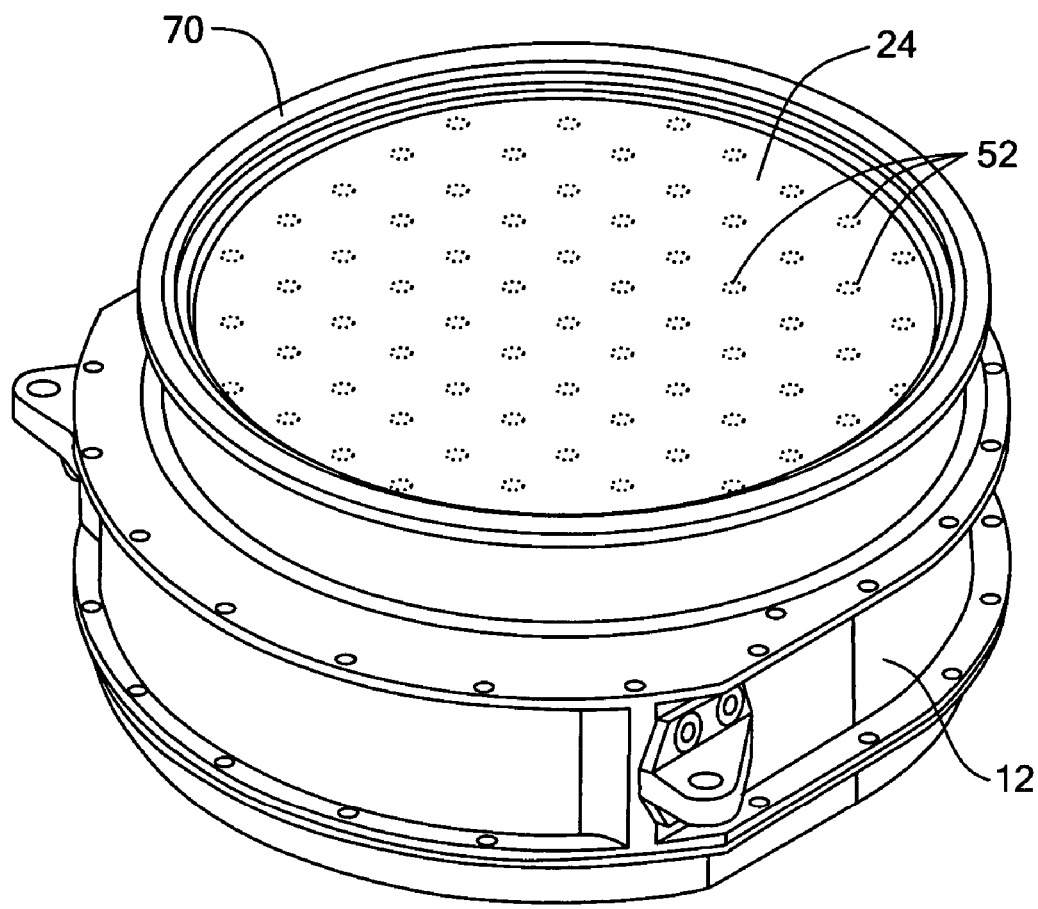

The simplicity of the assembly and fabrication of the system is displayed in FIGS. 8A-K. There is presented a base 16, FIG. 8A and an actuator 18, FIG. 8B, which is mounted on printed circuit board 20, FIG. 8C. An array 21 of such printed circuit boards with actuators appears as in FIG. 8D. FIG. 8E displays the top mirror surface of faceplate 24 and FIG. 8F shows the underside containing the pusher pads 52. Frame, or bezel 12, FIG. 8G, then receives base 16 which may be made of e.g. silicon, ultra-low expansion (ULE) glass made by Corning, FIG. 8H, on top of which is mounted the array 21 of printed circuit boards 20 with actuators 18, FIG. 8I. If the frame does not have positioning slots as in FIG. 1, then a jig (not shown) would be used here. Then faceplate 24 is mounted on top of actuators 18 with the push pins 52 shown in phantom in FIG. 8J bonded to the tops of the actuators while the bottoms of the actuators are attached to base 16. The assembly may be completed by the addition of an aperture plate 70, FIG. 8K. The pushpins are shown in phantom in FIGS. 8J and 8K as they are on the under side and would not be truly visible.

Figure 9:
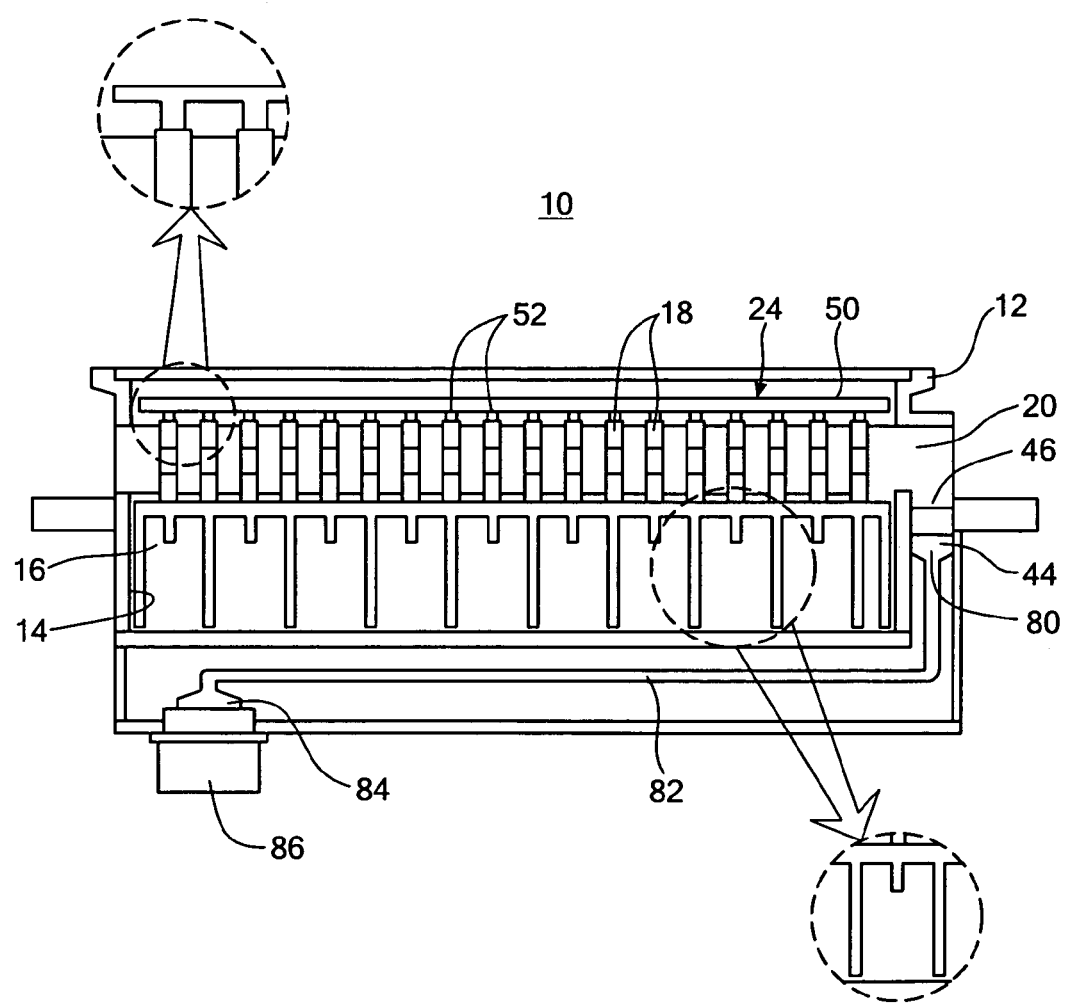
FIG. 9 is a schematic side sectional view showing the electrical connection of the printed circuit boards to a connection device and subsequent connection to an external connector.

System 10, FIG. 9, employs a hollow base 16 mounted in well 14 and frame 12 is without slots for the printed circuit boards 20. The connector 44 at the end 46 of each printed circuit board mates with female connector 80 which through cable 82 is further attached to connector base 84 for an external connector 86 whereby the selective energization of actuators 18 can be accomplished.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A high authority deformable mirror system comprising:

an optical faceplate;

a frame including a plurality of prealigned mounting slots;

a base;

a plurality of printed circuit boards mounted in said prealigned mounting slots and each including at least one actuator;

each actuator engaging at one end said base and at the other said optical faceplate;

each printed circuit board providing conductor paths between its associated actuators and a connector device for selectively energizing said actuators.

2. The high authority deformable optical system of claim 1 in which said faceplate includes a mirror on its front face.

3. The high authority deformable optical system of claim 1 in which said faceplate includes pusher pads on its back face.

4. The high authority deformable optical system of claim 3 in which said pusher pads are integral with the faceplate.

5. The high authority deformable optical system of claim 1 in which said base includes a reaction mass.

6. The high authority deformable optical system of claim 1 in which said base is solid.

7. The high authority deformable optical system of claim 1 in which said base is hollow.

8. The high authority deformable optical system of claim 1 in which said printed circuit boards are disposed in an aligned relationship.

9. The high authority deformable optical system of claim 1 in which said actuators are bonded to said base and faceplate.

10. The high authority deformable optical system of claim 9 in which said actuators are bonded to said base and faceplate with an adhesive.

* * * * *